United States Patent
Shao et al.

(10) Patent No.: US 11,356,731 B1
(45) Date of Patent: Jun. 7, 2022

(54) METHOD AND ELECTRONIC DEVICE FOR DISPLAYING VIDEO

(71) Applicant: BEIJING DAJIA INTERNET INFORMATION TECHNOLOGY CO., LTD., Beijing (CN)

(72) Inventors: Pengxiang Shao, Beijing (CN); Dexing Yang, Beijing (CN); Xing Fan, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/394,460

(22) Filed: Aug. 5, 2021

(30) Foreign Application Priority Data

Dec. 29, 2020 (CN) .......................... 202011589735.4

(51) Int. Cl.
*H04N 7/173* (2011.01)
*H04N 21/4402* (2011.01)
*H04N 21/488* (2011.01)

(52) U.S. Cl.
CPC . *H04N 21/440245* (2013.01); *H04N 21/4884* (2013.01)

(58) Field of Classification Search
CPC ................... H04N 21/440245; H04N 21/4884
See application file for complete search history.

(56) References Cited

U.S. PATENT DOCUMENTS

| 2009/0027552 | A1* | 1/2009 | Yang ................. H04N 21/4884 348/465 |
| 2011/0035702 | A1 | 2/2011 | Williams |
| 2011/0285726 | A1* | 11/2011 | Redmann ............. H04N 9/3185 345/467 |
| 2019/0037168 | A1* | 1/2019 | Tsukagoshi ........ H04N 5/44504 |
| 2019/0394419 | A1* | 12/2019 | Zhang ............. H04N 21/44008 |

FOREIGN PATENT DOCUMENTS

| CN | 110381353 A | 10/2019 |
| CN | 111078090 A | 4/2020 |

OTHER PUBLICATIONS

European Patent Office, Search Report for EP application 21190100.4, dated Jan. 28, 2022.

* cited by examiner

*Primary Examiner* — Mulugeta Mengesha
(74) *Attorney, Agent, or Firm* — Timothy W. Menasco, Esq.; Harter Secrest & Emery LLP (57) ABSTRACT

The disclosure can provide a method, an electronic device, and a storage medium for displaying a video. The method includes: obtaining key content information of a first video, the key content information for indicating a key element region included in the first video; obtaining a second video by processing the first video based on the key content information and a size of a display region, the second video being suitable to the size of the display region, and the second video including the key element region; and displaying the second video in the display region.

18 Claims, 6 Drawing Sheets

METHOD AND ELECTRONIC DEVICE FOR DISPLAYING VIDEO

CROSS-REFERENCE TO RELATED APPLICATION

This application is based on and claims priority to Chinese Patent Application No. 202011589735.4 filed on Dec. 29, 2020, the content of which is hereby incorporated by reference in its entirety into this disclosure.

FIELD

The disclosure relates to the field of video processing techniques, and more particularly, to a method, an electronic device, and a storage medium for displaying a video.

BACKGROUND

Short-form videos have become a preferred medium for users to record their lives and share information. When a user employs an electronic device to play a video, it is usually expected that the video may be displayed in full screen on the electronic device to realize a better playing effect.

At present, when the electronic device displays the video in full screen, it may usually enlarge and display the video based on a size of a screen of the electronic device.

SUMMARY

According to embodiments of the disclosure in a first aspect, a method for displaying a video is provided. The method includes: obtaining key content information of a first video, the key content information for indicating a key element region included in the first video; obtaining a second video by processing the first video based on the key content information and a size of a display region, the second video being suitable to the size of the display region, and the second video including the key element region; and displaying the second video in the display region.

According to embodiments of the disclosure in a second aspect, an electronic device is provided. The electronic device includes at least one processor; and a memory communicatively coupled to the at least one processor. The memory is configured to store instructions executable by the at least one processor, and the instructions cause the at least one processor to perform the above method in response that the instructions are executed by the at least one processor.

According to embodiments of the disclosure in a third aspect, a computer-readable storage medium having a computer program stored thereon is provided. The computer program is configured to cause a computer to perform the above method.

Other features and advantages of the disclosure will be given in the following descriptions, become apparent in part from the following descriptions, or be learned from the practice of the disclosure. The objectives and other advantages of the disclosure may be realized and obtained through structures pointed out in the descriptions, claims, and drawings.

BRIEF DESCRIPTION OF THE DRAWINGS

A brief description of drawings used in embodiments is given below to clearly illustrate technical solutions of embodiments of the disclosure. Obviously, the drawings in the following descriptions are only part embodiments of the disclosure, and for those skilled in the art, other drawings may be obtained according to these drawings without creative labor.

DETAILED DESCRIPTION

To make the objectives, technical solutions, and advantages of the disclosure clearer, the disclosure will be described in detail below with reference to the drawings and embodiments.

It should be noted that the terms such as "first" and "second" in the specification and claims of the disclosure are used to distinguish similar objects, and not necessarily used to describe a specific order or sequence. It should be understood that the data used in this way may be interchanged with each other under appropriate circumstances so that the embodiments of the disclosure described herein may be implemented in a sequence other than those illustrated or described herein. The implementation manners described in the following embodiments do not represent all implementation manners consistent with the disclosure. Rather, they are merely examples of apparatuses and methods consistent with some aspects of the disclosure as detailed in the appended claims.

When the electronic device displays the video in full screen, it may usually enlarge and display the video based on a size of a screen of the electronic device. However, since content may vary with videos, key content of the video may be lost after the video is enlarged and displayed. Therefore, the playing effect of the video becomes worse, and the video viewing experience of the user may be affected.

In view of this, the disclosure proposes a method, an apparatus, an electronic device, and a storage medium for displaying a video, to solve the above-mentioned problems. To facilitate the understanding of technical solutions provided in some embodiments of the disclosure, some terms involved in the disclosure will be described below.

A key element refers to key information in the video. The information may be used to convey important information such as subtitles and special effects in the video.

A key element region, as the name implies, refers to a location region located by the key element in the video. When the key element appears in multiple images and locations of the key element in the multiple images are different, a range capable of enclosing the key element in the multiple images as the key element region.

Key content information, the key content information in some embodiments of the disclosure is configured to indicate a region of the key element, which may be understood as another indirect or direct expression of the key element region.

The inventive concept of the disclosure is to recognize the key element region in the video, and thus to obtain the key content information for indicating the key element region, and to adapt based on a size of a display region. For example, a display size of the video is adjusted so that a finally-displayed video may be adapted to the size of the display region. Therefore, the key content information in the video to be displayed may be obtained. The video to be displayed may be processed based on the key element region indicated in the key content information and the size of the display region. It may adapt to the display region for displaying without missing the key element region. The video display effect may be improved. The video viewing experience of the user may be improved.

To make the objectives, technical solutions, and advantages of embodiments of the disclosure clearer, the technical solutions in the embodiments of the disclosure will be described clearly and completely in conjunction with the drawings in the embodiments of the disclosure.

Figure 1:
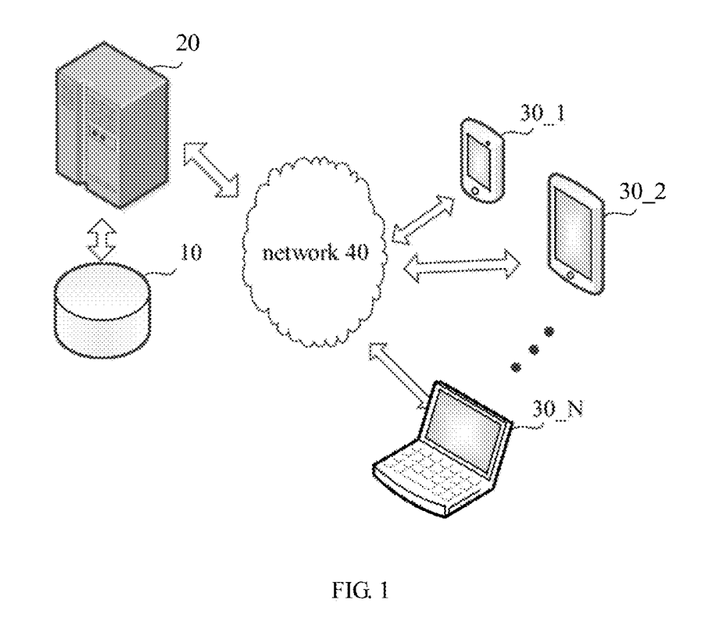
FIG. 1 is a schematic diagram illustrating an application environment according to some embodiments of the disclosure.

FIG. 1 is a schematic diagram illustrating an application environment according to some embodiments of the disclosure.

As illustrated in FIG. 1, the application environment may include, for example, a storage system 10, a server 20, and terminal devices 30 (30_1, 30_2 . . . 30_N). The terminal devices 30 may be any suitable electronic devices configured for network accessing. The terminal devices 30 may include but be not limited to computers, notebook computers, smart phones, tablet computers, or other types of terminals. The storage system 10 may store videos that may be accessed. The server 20 is configured to realize interaction with the terminal devices 30. The server 20 may obtain the video from the storage system 10 and obtain the key content information in the video and feed the obtained information back to the terminal device 30. The terminal device 30 may adapt and process the video with reference to the display region based on the key content information and display the adapted and processed video.

The terminal devices 30 may also communicate with each other (for example, between 30_1 and 30_2 or 30_N) via the network 40. The network 40 may be a network for information transmission in a broad sense, and may include one or more communication networks, such as a wireless communication network, Internet, a private area network, a local area network, a metropolitan area network, a wide area network, or a cellular data network.

In the description of the disclosure, a single server or a single terminal device is described in detail, but those skilled in the art should understand that the single server 20, terminal device 30, and storage system 10 illustrated are intended to indicate that technical solutions of the disclosure relate to operations of terminal devices, servers, and storage systems. The detailed description of the single server 20, terminal device 30, and storage system 10 may be at least for convenience of explanation, but may not imply limitations on the number, types, or locations of terminal devices and servers. It should be noted that when additional modules are added to the illustrated environment or individual modules are removed from the illustrated environment, underlying concepts of the embodiments of the disclosure will not be changed. In addition, although a two-way arrow from the storage system 10 to the server 20 is illustrated in FIG. 1 for the convenience of description, those skilled in the art may understand that the above-mentioned data transmission and reception may also be realized through the network 40.

Figure 2:
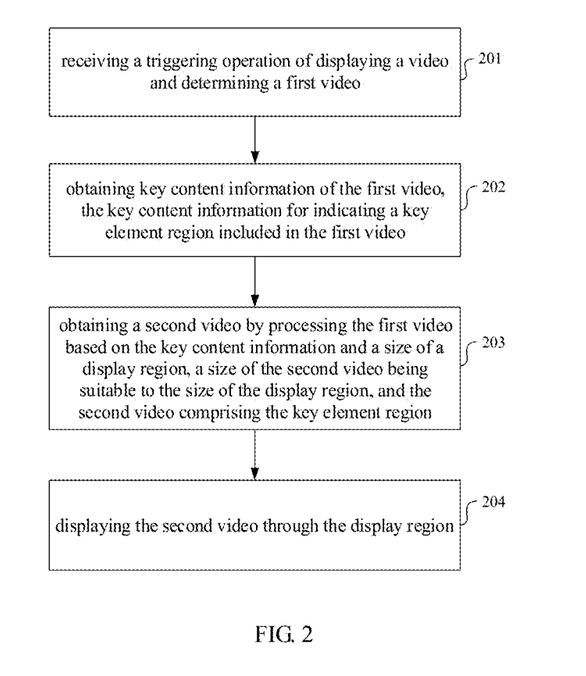
FIG. 2 is a flowchart illustrating a method for displaying a video according to some embodiments of the disclosure.

As illustrated in FIG. 2, FIG. 2 depicts a flowchart illustrating a method for displaying a video according to some embodiments of the disclosure. In some embodiments, the method is applied to the terminal device 30 as mentioned above.

The user may select a first video that he/she wants to display based on his/her needs. For example, he/she may select the first video on a homepage or recommendation page of a short-form video platform through a triggering operation of displaying a video. The triggering operation of displaying the video may be, for example, at least one or a combination of a touch operation, a gesture operation, and a speech operation. Therefore, the triggering operation of displaying the video may be received and the first video may be determined in block 201.

Key content information of the first video is obtained in block 202. The key content information may be for indicating a key element region included in content of the first video.

In some embodiments, the key content information may be obtained based on the following manner to display key elements as completely as possible. For example, locations of key elements in the first video may be detected and a location region of each key element in the first video may be obtained in action B1.

The manner of detecting the location of the key element may be determined based on characteristics of the key element. For example, if the key element is a key person, the location may be detected based on characteristics of the person. If the key element is an animal, the location may be detected based on characteristics of the animal. If the key element is character content, character detection technologies may be employed for detection. For example, OCR (Optical Character Recognition) may be employed for detection.

During implementation, a neural network model of key elements may be trained to realize location detection of key elements.

A total region range of the key elements in the first video may be determined based on the location region of each key element in the first video as the key element region in action B2.

Figure 3:
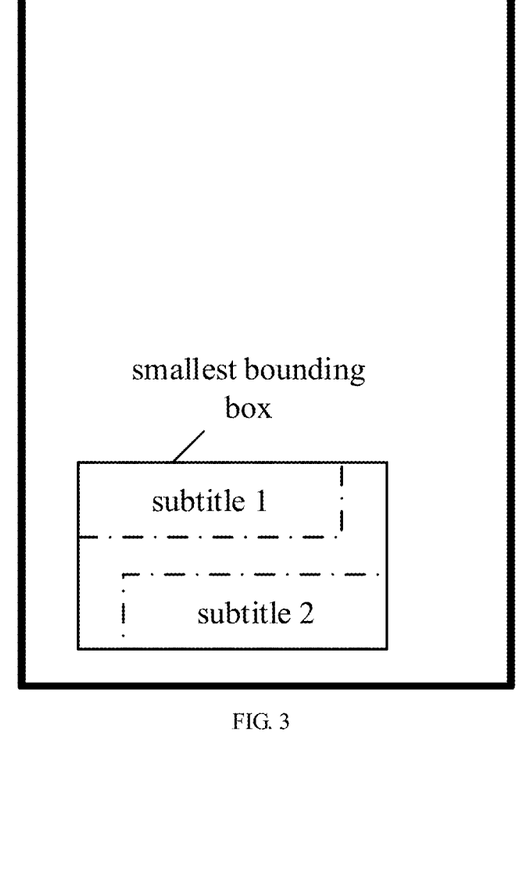
FIG. 3 is a schematic diagram illustrating a smallest bounding box of subtitle boxes according to some embodiments of the disclosure.

During implementation, the total region range may be of any shape, as long as it may enclose all the key element regions. There may be one total region range for each image. Therefore, it is adapted based on each image when it is adapted to the size of the display region subsequently. To facilitate implementations and ensure smoothness of images, in some embodiments of the disclosure, the total region range may be a region range covering the key element regions of all images. For example, a smallest bounding box that encloses each location region may be determined based on the location region of each key element in the first video as the total region range. Therefore, the smallest bounding box may be used as a simple manner to accurately filter out the total range of the key elements in the whole video. For example, take a subtitle as the key element, as illustrated in FIG. 3. When the first image includes subtitle 1 and the second image includes subtitle 2, locations of subtitle 1 and subtitle 2 in their respective images are illustrated in FIG. 3 in the dotted boxes. The smallest bounding box of the two subtitles may be found, and the total region range of subtitle 1 and subtitle 2 may be determined based on the location of the smallest bounding box in the video. Because the smallest bounding box may cover all the key elements and its location is relatively accurate, it may not need to process the key element of each image separately. It may make the same adaptation processing for each image of the whole first video and improve the processing efficiency.

After obtaining the key element region, the key content information may be determined based on the key element region in action B3.

Thus, the key element region may be determined by the location detection, and then the key content information may be determined based on the key element region. In some embodiments, the key element region is suitable for the whole video region, so the unified adaptation processing may be performed for each image in the video in the subsequent processing, and the processing efficiency may be improved.

As mentioned above, a second video is obtained by processing the first video based on the key content information and a size of a display region in block 203, to display the key elements in the first video well. A size of the second video is suitable to the size of the display region. The second video includes the key element region.

That is, in the video processing, the key element region should be in the second video as far as possible, so that the key elements may be displayed as completely as possible when the second video is displayed.

In some embodiments, to enable the second video to include the key element region, the location of the key element region may be changed, or the key elements in the key element region may be rearranged, so that the key elements in the key element region may be included in the second video for displaying.

In some embodiments, to make operations simple and easy, under a constraint that the key element region after zooming out the first video is fully displayed in the display region, a zoom ratio of the first video is determined based on the key content information and the size information of the display region, and the second video is obtained by zooming out the first video based on the zoom ratio.

The content of the first video, especially the key element region, may be completely included in the second video by the zooming-out processing, and more information of the first video may also be retained in the second video, so as to fully display the content of the first video.

The following describes how to determine the zoom ratio of the first video based on the key content information and the size information of the display region. For example, it may include the following.

In action C1, a first zoom ratio is determined based on a size of the first video and the size of the display region so that a size of a target direction of the first video after zooming out is equal to a size of the target direction of the display region. The target direction may be any one of length and width directions.

For example, considering the width direction of the video, if the width after zooming out the video may fill the width of the entire display region, the zoom ratio of the width is S1. Similarly, considering the height direction of the video, if the height after zooming out the vide may fill the height of the display region, the zoom ratio of the height is S2. If the width direction after zooming out is expected to be filled with the display region, the zoom ratio S1 is selected as the first zoom ratio. If the height direction after zooming out is expected to be filled with the display region, the zoom ratio S2 is selected as the first zoom ratio.

In action C2, a second zoom ratio is determined based on the key content information so that a shortest distance from at least one boundary of the key element region after zooming out the first video to a boundary of the display region is smaller than a designated distance.

For example, during implementation, the key content information may describe the key element region from multiple angles. For example, in some embodiments, the key content information may include the following.

a) A first ratio between a left boundary distance and a width of the display region; the left boundary distance is a distance between a left boundary of the key element region and a left boundary of the first video.

b) A second ratio between a top distance and a height of the display region; the top distance is a distance between a top of the key element region and a top of the first video.

c) A third ratio between a width of the key element region and the width of the display region.

d) A fourth ratio between a height of the key element region and the height of the display region.

Therefore, the key content information may comprehensively describe the key element region from positional relationships between four boundaries of the key element region and four boundaries of the display region.

Figure 4:
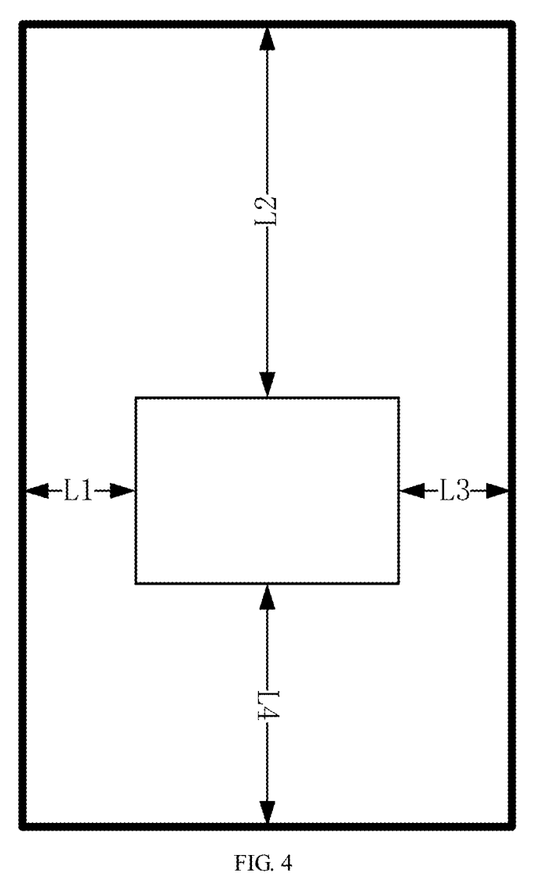
FIG. 4 is a schematic diagram illustrating a subtitle box according to some embodiments of the disclosure.

In some embodiments, a subtitle is taken as an example. To improve the accuracy of information in the subtitle region and satisfy requirements of full-screen display to the greatest extent, the location of each subtitle region in the video may be found. Each subtitle corresponds to a subtitle box. Each subtitle box has corresponding distances relative to boundaries of the video. For example, as illustrated in FIG. 4 in the disclosure, distances between boundaries of the subtitle box and the boundaries of the video may be considered to include the following.

The distance L1 between a left boundary of the subtitle box and a left boundary of the video.

The distance L2 between an upper boundary of the subtitle box and an upper boundary of the video.

The distance L3 between a right boundary of the subtitle box and a right boundary of the video.

The distance L4 between a lower boundary of the subtitle box and a lower boundary of the video.

When there are multiple subtitle boxes, that is, there are multiple subtitles, the boundary of the subtitle box with the smallest distance is selected as the boundary of the subtitle region on each boundary from the distances corresponding to the above four types of boundaries. For example, subtitle box 1 is closest to the left boundary of the video, so that the left boundary of subtitle box 1 is taken as the left boundary of the subtitle region; the upper boundary of subtitle box 2 is closest to the upper boundary of the video, so that the upper boundary of subtitle box 2 is taken as the top (that is, the upper boundary) of the subtitle region. The right boundary and the lower boundary of the subtitle region are similar and will not be repeated herein.

The second zoom ratio may be determined based on the first ratio, second ratio, third ratio, and fourth ratio corresponding to the above four distances, through the following manners.

Action D1, a left zooming-out factor corresponding to when the left boundary of the key element region is zoomed out to has a distance with a left boundary of the display region and less than the designated distance, is determined based on the first ratio.

For example, to consider the impact of the first video after zooming out on displayable content of the second video, it is determined that the left zooming-out factor is a zooming-out upper limit in response to the first ratio being greater than or equal to a reference ratio; and the left zooming-out factor is determined based on the reference ratio and the first ratio in response to the first ratio being less than the reference ratio.

For example, when the first ratio is greater than or equal to 0.5, the left zooming-out factor is determined to be the zooming-out upper limit; when the first ratio is less than 0.5, the left zooming-out factor is determined based on a formula (1) of:

$$\text{leftScale}=0.5/(0.5-\text{leftRatio}) \qquad (1)$$

where, leftScale represents the left zooming-out factor and leftRatio represents the first ratio.

From this, it may be determined that when the left boundary of the key element region is zoomed out to the left boundary of the display region, the applicable zooming-out factor is the left zooming-out factor, and the processing efficiency may be improved by determining the left zooming-out factor in a simple manner.

Action D2, a right zooming-out factor corresponding to when a right boundary of the key element region is zoomed out to has a distance with a right boundary of the display region and less than the designated distance, is determined based on the first ratio and the third ratio.

In some embodiments, it is determined that the right zooming-out factor is a zooming-out upper limit in response to a sum of the first ratio and the third ratio being greater than or equal to a reference ratio; and the right zooming-out factor is determined based on the reference ratio, the first ratio, and the third ratio in response to the sum of the first ratio and the third ratio being less than the reference ratio.

For example, when the sum of the first ratio and the third ratio is greater than or equal to 0.5, it is determined that the right zooming-out factor is the zooming-out upper limit; when the sum of the first ratio and the third ratio is less than 0.5, the right zooming-out factor is determined based on a formula (1) of:

$$\text{rightScale}=0.5/((\text{leftRatio}+\text{widthRatio})-0.5) \qquad (2)$$

where, rightScale represents the right zooming-out factor, leftRatio represents the first ratio, and widthRatio represents the third ratio.

From this, it may be determined that when the right boundary of the key element region is zoomed out to the right boundary of the display region, the applicable zooming-out factor is the right zooming-out factor, so as to improve the processing efficiency.

Action D3, a top zooming-out factor corresponding to when a top of the key element region is zoomed out to has a distance with a top of the display region and less than the designated distance, is determined based on the second ratio.

In some embodiments, it is determined that the top zooming-out factor is a zooming-out upper limit in response to the second ratio being greater than or equal to a reference ratio; and the top zooming-out factor is determined based on the reference ratio and the second ratio in response to the second ratio being less than the reference ratio.

For example, when the second ratio is greater than or equal to 0.5, it is determined that the top zooming-out factor is the zooming-out upper limit.

When the second ratio is less than 0.5, the top zooming-out factor is determined based on a formula (3) of:

$$\text{topScale}=0.5/(0.5-\text{topRatio}) \qquad (3)$$

where, topScale represents the top zooming-out factor, and topRatio represents the second ratio.

From this, it may be determined that when the top (or upper) boundary of the key element region is zoomed to the top (or upper) boundary of the display region, the applicable zooming-out factor is the top zooming-out factor, thereby improving the processing efficiency.

Action D4, a bottom zooming-out factor corresponding to when a lower boundary of the key element region is zoomed out to has a distance with a lower boundary of the display region and less than the designated distance, is determined based on the second ratio and the fourth ration.

In some embodiments, it is determined that the bottom zooming-out factor is a zooming-out upper limit in response to a sum of the second ratio and the fourth ratio being greater than or equal to a reference ratio; and the bottom zooming-out factor is determined based on the reference ratio, the second ratio, and the fourth ratio in response to the sum of the second ratio and the fourth ratio being less than the reference ratio.

For example, when the sum of the second ratio and the fourth ratio is greater than or equal to 0.5, the bottom zooming-out factor is determined to be the zooming-out upper limit; when the sum of the second ratio and the fourth ratio is less than 0.5, the bottom zooming-out factor is determined based on a formula (4) of:

$$\text{bottomScale}=0.5/((\text{topRatio}+\text{heightRatio})-0.5) \qquad (4)$$

where, bottomScale represents the bottom zooming-out factor, topRatio represents the second ratio, and heightRatio represents the fourth ratio.

From this, it may be determined that when the lower boundary of the key element region is zoomed to the lower boundary of the display region, the applicable zooming-out factor is the bottom zooming-out factor, thereby improving the processing efficiency.

In action D5, a minimum of the left zooming-out factor, the right zooming-out factor, the top zooming-out factor, and the bottom zooming-out factor is selected as the second zoom ratio.

Therefore, when each of the four boundaries is zoomed out to the corresponding boundary of the display region, the minimum value of the zooming-out factor of each boundary may ensure that the final key element region may be included in the second video. Therefore, a suitable zoom ratio may be selected as the second zoom ratio based on ratios of different boundaries. The second zoom ratio may better adapt to the size of the display region and the video content may be displayed in full screen as much as possible.

As mentioned above, after the first zoom ratio and the second zoom ratio are determined, a minimum of the first zoom ratio and the second zoom ratio may be selected as the zoom ratio of the first video in action C3.

Therefore, considering the first zoom ratio may ensure that the width or height of the second video after zooming out the first video may fill the display region. Considering the second zoom ratio may prevent a certain boundary region of the key element region from being cropped. Selecting the minimum of the first zoom ratio and the second zoom ratio may ensure that the key element region may be completely included in the second video.

After the adaptation process is performed, the second video may be displayed through the display region in block 204.

Therefore, through the key content information of the key element region, it may be a good guide to adapt the first video to obtain the second video based on the size of the display region, so that the second video may include the key elements and the key elements may be displayed.

If the key element is a subtitle, character recognition may be performed on each frame of the first video through a text recognition manner to obtain a location region of each subtitle in the first video. The text recognition manner is simple and easy to implement, and may accurately and quickly locate the text region.

Figure 5:
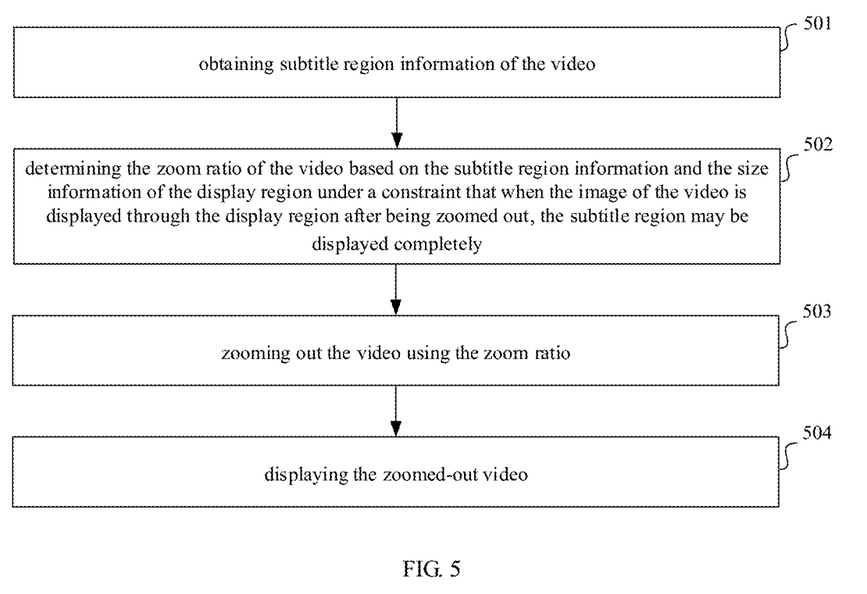
FIG. 5 is a flowchart illustrating a method for displaying a video, applicable to subtitles, according to some embodiments of the disclosure.

The following takes subtitle information as the key element as an example to describe the method for displaying the video in some embodiments of the disclosure. As illustrated in FIG. 5, it includes the following.

In block 501, subtitle region information of the video is obtained as the key content information.

The subtitle region information is used to describe the location information of the subtitle region in the video. The location information may be location coordinates of vertices of the subtitle region in the video, or location coordinates of each boundary of the subtitle region in the video. When the smallest bounding box of subtitles, that is, the smallest rectangle that may include all subtitles in the video, may be as an outline of the subtitle region, the location information of the subtitle region may also be location coordinates of a certain vertex of the subtitle region or length and width information of the subtitle region.

In some embodiments, the subtitle region information may also be some proportion information. For example, it may include the following.

1) A first ratio between a left boundary distance and a width of the display region; the left boundary distance is a distance between a left boundary of the subtitle region and a left boundary of the video.

2) A second ratio between a top distance and a height of the display region; the top distance is a distance between a top of the subtitle region and a top of the video.

3) A third ratio between a width of the subtitle region and the width of the display region.

4) A fourth ratio between a height of the subtitle region and the height of the display region.

During implementation, each of the distances in 1) to 4) may be expressed by the number of pixels. The size of the video may also be expressed by the number of pixels in the length and width directions. In this way, the various distances and ratios may be calculated well based on the number of pixels. If OCR is used to detect location coordinates and length information of each subtitle box in the video, it is represented by a four-tuple. The four-tuple is represented by <left, top, width, height>, where left and top are the number of pixels of the subtitle box relative to an origin of the upper left corner of the image. In this way, the information of N subtitle boxes may be obtained for the entire video. Minimum distances between each subtitle box and the left boundary, the top boundary, the bottom boundary, and the right boundary of the video may be traversed, thereby obtaining the subtitle region that includes all subtitle boxes.

A formula for determining the minimum distance of the left boundary may be: min {left1, left2, . . . , lefln}, where leftn represents a left value of the $n^{th}$ box.

A formula for determining the minimum distance of the top boundary may be: min {top1, top2, . . . , topn}, where topn represents a top value of the $n^{th}$ box.

A formula for determining the minimum distance of the bottom boundary may be: min {VideoHeight−(top1+height1), VideoHeight−(top2+height2), . . . , VideoHeight−(topn+heightn)}, where VideoHeight represents the height of the video and heightn represents a height value of the $n^{th}$ box.

A formula for determining the minimum distance of the right boundary may be: min {VideoWidth−(left1+width1), VideoWidth−(left2+width2), . . . , VideoWidth−(leftn+widthn)}, where VideoWidth represents the width of the video, and widthn represents a width value of the $n^{th}$ box.

Through the above actions, the distances between the subtitle region in the video and the top, bottom, left, and right boundaries of the video may be obtained as: <minTop, minBottom, minLeft, minRight>.

In some embodiments, the subtitle region information may be determined by the terminal device after analyzing the video, or the server may analyze the video in advance and send the analyzing result to the terminal device. Therefore, the method for determining the subtitle region information may be implemented in any of the following two manners.

Manner 1. When the terminal device analyzes the video to determine the subtitle region information, it may be implemented as follows.

A subtitle range may be detected from each image including the subtitle in the video through the text recognition, to obtain multiple subtitle ranges. A subtitle region that enclose the multiple subtitle ranges may be determined based on the multiple subtitle ranges as the subtitle region of the video. The subtitle region information is determined based on the location information of the subtitle region in the video.

In some embodiments, the terminal device may determine the subtitle region information of the video in real time, and apply the subtitle region information to the display operation of the terminal device, without relying on other devices for implementation. The display stability may be ensured.

In some embodiments, the subtitle region information may be determined by the smallest bounding box including all subtitles, which may be implemented as the following actions.

Action A1, location information of each subtitle in the video may be recognized using the text recognition.

Action A2, the smallest bounding box capable of enclosing all the subtitles in the video may be determined based on the location information of all the subtitles in the video.

Action A3, the subtitle region information may be determined based on the location information of the smallest bounding box in the video.

The subtitle region information is determined based on the smallest bounding box. Since the smallest bounding box may cover all subtitles, it is not necessary to process each subtitle separately, so the implementation is relatively simple.

In some embodiments, to improve the accuracy of the subtitle region information and satisfy requirements of full-screen display to the greatest extent, the location of each subtitle region may also be found in the video. Each subtitle corresponds to a subtitle box. Each subtitle box has corresponding distances relative to boundaries of the video. For example, as illustrated in FIG. 4 in the disclosure, distances between boundaries of the subtitle box and the boundaries of the video may be considered to include the following.

The distance L1 between a left boundary of the subtitle box and a left boundary of the video.

The distance L2 between an upper boundary of the subtitle box and an upper boundary of the video.

The distance L3 between a right boundary of the subtitle box and a right boundary of the video.

The distance L4 between a lower boundary of the subtitle box and a lower boundary of the video.

When there are multiple subtitle boxes, that is, there are multiple subtitles, the boundary of the subtitle box with the smallest distance is selected as the boundary of the subtitle region on each boundary from the distances corresponding to the above four types of boundaries. For example, subtitle box 1 is closest to the left boundary of the video, so that the left boundary of subtitle box 1 is taken as the left boundary of the subtitle region; the upper boundary of subtitle box 2 is closest to the upper boundary of the video, so that the upper boundary of subtitle box 2 is taken as the top (that is, the upper boundary) of the subtitle region. The right boundary and the lower boundary of the subtitle region are similar and will not be repeated herein.

Manner 2. When the server determines the subtitle region information and sends the subtitle region information to the terminal device, it may be implemented as follows.

Action E1, a request for obtaining subtitle information on the video is sent to the server.

The request for obtaining the subtitle information on the video may be a request for obtaining the video. The request for obtaining the video in the related art may be multiplexed. When the server sends the video data to the terminal device, it may also send the subtitle region information of the video to the terminal device at the same time.

Of course, in some embodiments, the request for obtaining the subtitle information may also be a separately-set request, as long as the subtitle region information of the video may be obtained based on the request. The specific form of the request and the sending timing may not be limited herein.

In some embodiments, the subtitle region information of different images in the video may be independent. That is, each image including the subtitle may correspond to its own subtitle region information. It is also possible to divide successive images in the video into one image group, and each image group may share one request for obtaining the subtitle information. The server may issue the subtitle region information of the image group to the terminal device based on the request.

In some embodiments, when the subtitle region information of each image in the video may be processed independently, some images may not include subtitles. Therefore, in some embodiments of the disclosure, each image may be associated with one piece of indication information. The indication information is used to indicate whether the corresponding image include the subtitle. When there is the subtitle in the image, it is considered how to perform the zooming-out processing based on the subtitle region information. Of course, when there is no subtitle region information, the zooming-out processing may be performed based on the size of the display region without considering the integrity of the subtitle.

Action E2, response information returned by the server for the request is received.

That is, the subtitle region information of the video determined by the server may be carried in the response information. Therefore, the subtitle region information of the video may be parsed from the response information in Action E3.

In some embodiments, the subtitle region information may be predetermined by the server, and the subtitle region information of each image may be obtained in the process of transcoding the video during implementation. So that when the video is sent to the terminal device, the subtitle region information may be obtained simply by reading the information. It may also avoid the inability to autonomously obtain the subtitle region information in the terminal device due to the deficiency of processing capabilities of the terminal device, so that the method for obtaining the subtitle region information may be compatible with terminal devices with different processing capabilities.

In block 502, the zoom ratio of the video is determined based on the subtitle region information and the size information of the display region under a constraint that when the image of the video is displayed through the display region after being zoomed out, the subtitle region may be displayed completely.

The constraint may ensure that the subtitle region may be displayed completely. On this basis, the size of the display region may be used as the reference to find the maximum zoom ratio so that it may ensure the complete display of the subtitle region and satisfy requirements of full-screen display as much as possible.

In some embodiments, the boundary information of each subtitle in the video may also be obtained. For each boundary of each subtitle, the maximum zoom ratio at which the corresponding boundary remains in the display region after the video is zoomed out may be determined based on the location of the boundary in the video, and the minimum zoom ratio is obtained from the maximum zoom ratios corresponding to all the boundaries of the subtitle. The minimum value is selected from the minimum zoom ratios corresponding to all the subtitles of the video, as the second zoom ratio. That is, the respective zoom ratios of the four boundaries may be determined when the four boundaries of each subtitle are not cropped after being zoomed out. The smallest zoom ratio of the respective zoom ratios may be selected as the maximum zoom ratio of the subtitle. For the same video, the minimum value is selected from the maximum zoom ratios of all the subtitles as the second zoom ratio. This may ensure that all subtitles in the same video may be displayed completely.

As illustrated in the foregoing, the minimum value of the first zoom ratio and the second zoom ratio may be selected as the zoom ratio of the video. That is, there is a trade-off between the full-screen display and the subtitle region not exceeding the boundaries.

In block 503, the video is zoomed out using the zoom ratio of the video.

In block 504, the zoomed-out video is displayed.

Figure 6:
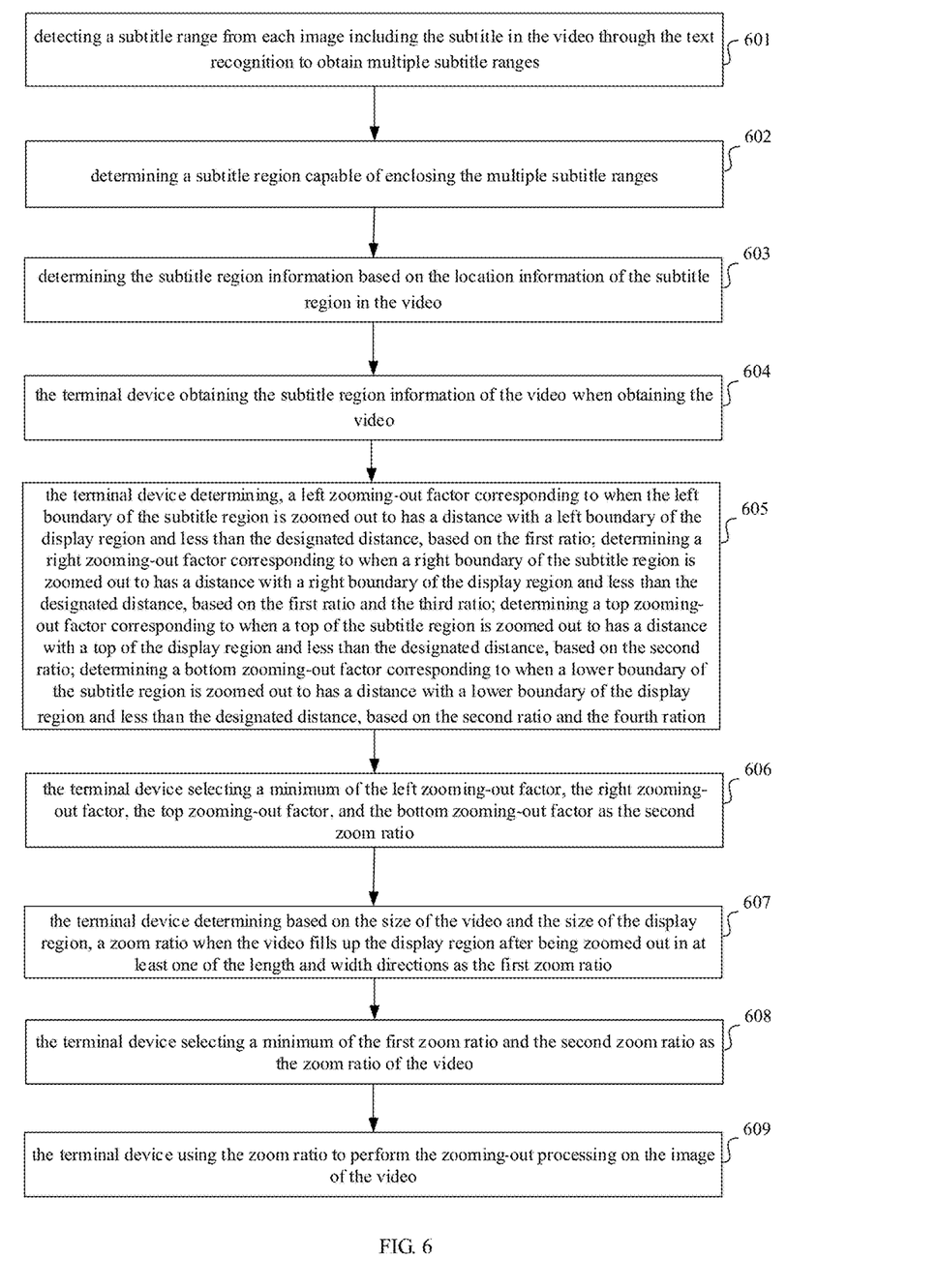
FIG. 6 is a flowchart illustrating a method for displaying a video, applicable to subtitles, according to some embodiments of the disclosure.

FIG. 6 is a flowchart illustrating a method for displaying a video, applicable to subtitles, according to some embodiments of the disclosure. As illustrated in FIG. 6, the method includes the following.

In block 601, a subtitle range may be detected from each image including the subtitle in the video through the text recognition to obtain multiple subtitle ranges.

As mentioned above, OCR is used to detect the location coordinates and length information of each subtitle box in the video, which is represented by a four-tuple <left, top, width, height>.

In block 602, a subtitle region capable of enclosing the multiple subtitle ranges is determined based on the multiple subtitle ranges as the subtitle region of the video.

In block 603, the subtitle region information is determined based on the location information of the subtitle region in the video.

For example, after obtaining distances <minTop, minBottom, minLeft, minRight> to the top, bottom, left, and right boundaries, the location ratios of the subtitle region in the video may be calculated, to correspond to the field in the subtitleAreaInfo structure. The calculation formula is as follows.

The first ratio between the left boundary distance and the width of the display region may be: leftRatio=minLeft/VideoWidth; where VideoWidth is the width of the video.

The second ratio between the top distance and the height of the display region may be: topRatio=minTop/VideoHeight; where VideoHeight represents the height of the video.

The third ratio between the width of the subtitle region and the width of the display region may be: widthRatio=(VideoWidth−minLeft−minRight)/VideoWidth.

The fourth ratio between the height of the subtitle region and the height of the display region may be: heightRatio=(VideoHeight−minTop−minBottom)/VideoHeight.

In block 604, when obtaining the video, the terminal device obtains the subtitle region information of the video.

In block 605, the terminal device determines, a left zooming-out factor corresponding to when the left boundary of the subtitle region is zoomed out to has a distance with a left boundary of the display region and less than the designated distance, based on the first ratio; determining a right zooming-out factor corresponding to when a right boundary of the subtitle region is zoomed out to has a distance with a right boundary of the display region and less than the designated distance, based on the first ratio and the third ratio; determining a top zooming-out factor corresponding to when a top of the subtitle region is zoomed out to has a distance with a top of the display region and less than the designated distance, based on the second ratio; determining a bottom zooming-out factor corresponding to when a lower boundary of the subtitle region is zoomed out to has a distance with a lower boundary of the display region and less than the designated distance, based on the second ratio and the fourth ration.

In block 606, the terminal device selects a minimum of the left zooming-out factor, the right zooming-out factor, the top zooming-out factor, and the bottom zooming-out factor as the second zoom ratio.

In block 607, the terminal device determines, based on the size of the video and the size of the display region, a zoom ratio when the video fills up the display region after being zoomed out in at least one of the length and width directions as the first zoom ratio.

In block 608, the terminal device selects a minimum of the first zoom ratio and the second zoom ratio as the zoom ratio of the video.

In block 609, the terminal device uses the zoom ratio to perform the zooming-out processing on the image of the video.

Figure 7:
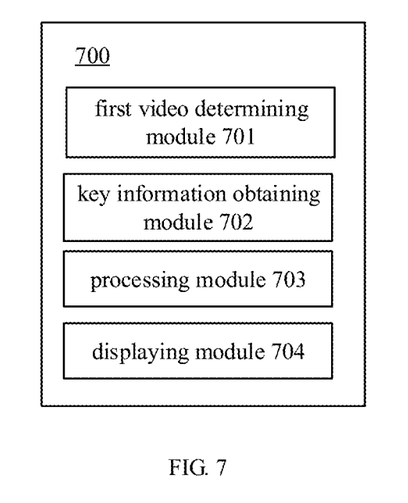
FIG. 7 is a block diagram illustrating an apparatus for displaying a video according to some embodiments of the disclosure.

As illustrated in FIG. 7, based on the same inventive concept, an apparatus 700 for displaying a video is proposed. The apparatus 700 includes: a first video determining module 701, a key information obtaining module 702, a processing module 703, and a displaying module 704.

The first video determining module 701 is configured to receive a triggering operation of displaying a video and determine a first video.

The key information obtaining module 702 is configured to obtain key content information of the first video, the key content information for indicating a key element region included in the first video.

The processing module 703 is configured to obtain a second video by processing the first video based on the key content information and a size of a display region, a size of the second video being suitable to the size of the display region, and the second video including the key element region.

The displaying module 704 is configured to display the second video through the display region.

In some embodiments, the key information obtaining module includes: a location detecting unit configured to detect locations of key elements in the first video and obtain a location region of each key element in the first video; a key element region determining unit configured to determine a total region range of the key elements in the first video based on the location region of each key element in the first video as the key element region; and a key information determining unit configured to determine the key content information based on the key element region.

In some embodiments, under a case that the key elements are subtitles, the location detecting unit is configured to: obtain a location region of each subtitle in the first video by character recognition on each frame of the first video.

In some embodiments, the key element region determining unit is configured to: determine a smallest bounding box capable of enclosing the location region of each key element in the first video as the key element region.

In some embodiments, the processing module includes: a first ratio determining unit configured to determine a zoom ratio of the first video based on the key content information and size information of the display region under a constraint that the key element region after zooming out the first video is fully displayed in the display region; and a zooming out unit configured to obtain the second video by zooming out the first video based on the zoom ratio.

In some embodiments, the first ratio determining unit is configured to: determine a first zoom ratio based on a size of the first video and the size of the display region so that a size of a target direction of the first video after zooming out is equal to a size of the target direction of the display region, the target direction being any one of length and width directions; determine a second zoom ratio based on the key content information so that a shortest distance from at least one boundary of the key element region after zooming out the first video to a boundary of the display region is smaller than a designated distance; and select a minimum of the first zoom ratio and the second zoom ratio as the zoom ratio of the first video.

In some embodiments, the key content information includes: a first ratio between a left boundary distance and a width of the display region; the left boundary distance is a distance between a left boundary of the key element region and a left boundary of the first video; a second ratio between a top distance and a height of the display region; the top distance is a distance between a top of the key element region and a top of the first video; a third ratio between a width of the key element region and the width of the display region; a fourth ratio between a height of the key element region and the height of the display region. The first ratio determining unit is configured to: determine a left zooming-out factor corresponding to when the left boundary of the key element region is zoomed out to has a distance with a left boundary of the display region and less than the designated distance, based on the first ratio; determine a right zooming-out factor corresponding to when a right boundary of the key element region is zoomed out to has a distance with a right boundary of the display region and less than the designated distance, based on the first ratio and the third ratio; determine a top zooming-out factor corresponding to when a top of the key element region is zoomed out to has a distance with a top of the display region and less than the designated distance, based on the second ratio; determine a bottom zooming-out factor corresponding to when a lower boundary of the key element region is zoomed out to has a distance with a lower boundary of the display region and less than the designated distance, based on the second ratio and the fourth ration; and select a minimum of the left zooming-out factor, the right zooming-out factor, the top zooming-out factor, and the bottom zooming-out factor as the second zoom ratio.

In some embodiments, during the determining the left zooming-out factor corresponding to when the left boundary of the key element region is zoomed out to has the distance with the left boundary of the display region and less than the designated distance, based on the first ratio, the first ratio determining unit is configured to: determine that the left zooming-out factor is a zooming-out upper limit in response to the first ratio being greater than or equal to a reference ratio; and determine the left zooming-out factor based on the reference ratio and the first ratio in response to the first ratio being less than the reference ratio.

In some embodiments, during the determining the right zooming-out factor corresponding to when the right boundary of the key element region is zoomed out to has the distance with the right boundary of the display region and less than the designated distance, based on the first ratio and the third ratio, the first ratio determining unit is configured to: determine that the right zooming-out factor is a zooming-out upper limit in response to a sum of the first ratio and the third ratio being greater than or equal to a reference ratio; and determine the right zooming-out factor based on the reference ratio, the first ratio, and the third ratio in response to the sum of the first ratio and the third ratio being less than the reference ratio.

In some embodiments, during the determining the top zooming-out factor corresponding to when the top of the key element region is zoomed out to has the distance with the top of the display region and less than the designated distance, based on the second ratio, the first ratio determining unit is configured to: determine that the top zooming-out factor is a zooming-out upper limit in response to the second ratio being greater than or equal to a reference ratio; and determine the top zooming-out factor based on the reference ratio and the second ratio in response to the second ratio being less than the reference ratio.

In some embodiments, during the determining the bottom zooming-out factor corresponding to when the lower boundary of the key element region is zoomed out to has the distance with the lower boundary of the display region and less than the designated distance, based on the second ratio and the fourth ration, the first ratio determining unit is configured to: determine that the bottom zooming-out factor is a zooming-out upper limit in response to a sum of the second ratio and the fourth ratio being greater than or equal to a reference ratio; and determine the bottom zooming-out factor based on the reference ratio, the second ratio, and the fourth ratio in response to the sum of the second ratio and the fourth ratio being less than the reference ratio.

For implementations and beneficial effects of various operations in various apparatuses for displaying the video, reference should be made to the description in the foregoing methods, which may not be repeated herein.

After introducing the methods and apparatuses for displaying the video in some embodiments of the disclosure, electronic devices in some embodiments of the disclosure is introduced as follows.

Those skilled in the art should understand that various aspects of the disclosure may be implemented as systems, methods, or program products. Therefore, various aspects of the disclosure may be implemented in the forms of: complete hardware implementation, complete software implementation (including firmware, microcode, etc.), or a combination of hardware and software implementations, which may be collectively referred to herein as "circuits", "modules" or "systems".

In some possible implementation manners, the electronic device according to the disclosure may at least include at least one processor and at least one memory. The memory is configured to store a program code. When the program code is executed by the processor, the processor is caused to execute actions in various methods for displaying the video according to various exemplary embodiments of the disclosure.

The electronic device 130 according to some embodiments of the disclosure may be described below with reference to FIG. 8. The electronic device 130 illustrated in FIG. 8 is an example, and should not bring any limitation to the functions and scope of the embodiments of the disclosure.

Figure 8:
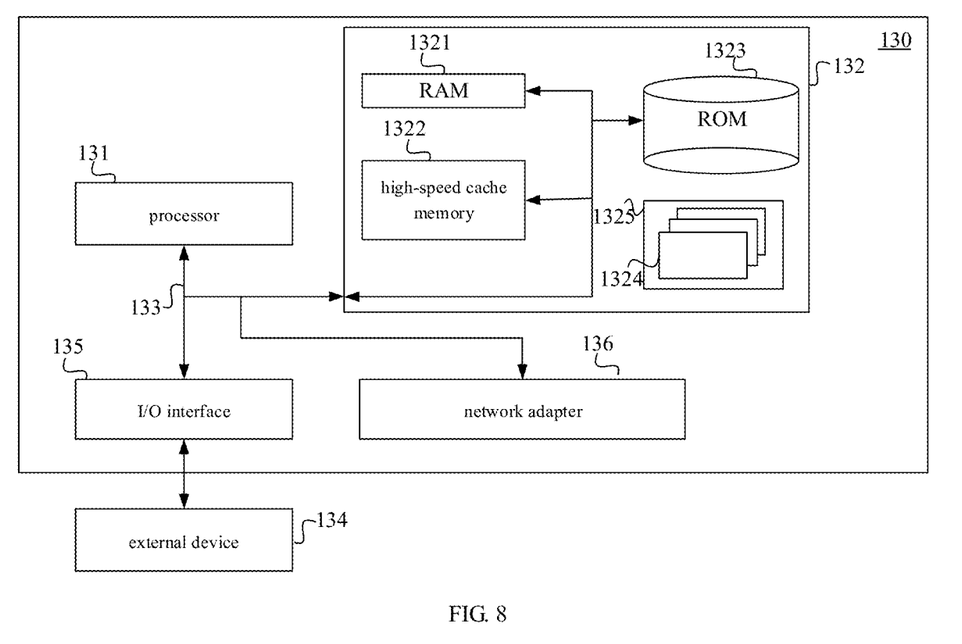
FIG. 8 is a block diagram illustrating an electronic device according to some embodiments of the disclosure.

As illustrated in FIG. 8, the electronic device 130 is represented in form of general-purpose electronic device. Components of the electronic device 130 may include, but be not limited to: the at least one processor 131, the at least one memory 132, and a bus 133 connecting different system components (including the memory 132 and the processor 131).

The bus 133 represents one or more of several types of bus structures, including a memory bus or a memory controller, a peripheral bus, a processor, or a local bus using any of a variety of bus structures.

The memory 132 may include a readable medium in form of volatile memory, such as a random-access memory (RAM) 1321 and/or a high-speed cache memory 1322, and may further include a read-only memory (ROM) 1323.

The memory 132 may also include a program/utility tool 1325 having a set of (at least one) program modules 1324. Such program modules 1324 may include but be not limited to: an operating system, one or more application programs, other program modules, and program data. Each of the examples or some combination of the examples may include the realization of the network environment.

The electronic device 130 may also communicate with one or more external devices 134 (such as, a keyboard, a pointing device, etc.). Furthermore, the electronic device 130 may also communicate with one or more communication devices enabling a user to interact with the electronic device 130 and/or other devices (such as a network card, modem, etc.) enabling the electronic device 1300 to communicate with one or more computer devices. This communication may be performed via the input/output (I/O) interface 135. Also, the electronic device 130 may communicate with one or more networks (such as a local area network (hereafter referred to as LAN), a wide area network (hereafter referred to as WAN) and/or a public network such as an Internet) through a network adapter 136. As illustrated in FIG. 8, the network adapter 136 communicates with other modules of the electronic device 130 over the bus 133. It should be understood that, although not illustrated in FIG. 8, other hardware and/or software modules may be used in connection with the electronic device 130. The hardware and/or software includes, but is not limited to, microcode, device drivers, redundant processors, external disk drive arrays, RAID (Redundant Array of Independent Disks) systems, tap Drives, and data backup storage systems.

In some possible implementation manners, various aspects of the method for displaying the video provided in the disclosure may also be implemented in form of program product including program codes. When the program product runs on a computer device, the program codes may make the computer device execute the actions in the method for displaying the video according to various embodiments of the disclosure described above.

The program product may adopt any combination of one or more readable media. The readable media may be readable signal media or readable storage media. The readable storage media may be, for example, but be not limited to, electrical, magnetic, optical, electromagnetic, infrared, or semiconductor systems, apparatuses, or devices, or a combination thereof. More specific examples (non-exhaustive list) of the readable storage media may include: electrical connections with one or more wires, portable disks, hard disks, random-access memory (RAM), read-only memory (ROM), erasable programmable read-only memory (EPROM or flash memory), optical fibers, compact disc read-only memory (CD-ROM), optical storage devices, magnetic storage devices, or any suitable combination thereof.

The program product provided in the embodiments of the disclosure may adopt a compact disc read-only memory (CD-ROM) and include program codes, and may be run on an electronic device. However, the program product of the disclosure is not limited thereto. In the disclosure, the readable storage medium may be any tangible medium that contains or stores programs, and the programs may be used by or in combination with an instruction execution system, apparatus, or device.

The readable signal media may include data signals propagated in baseband or as a part of carriers, which may carry readable program codes therein. The propagated data signals may employ many forms, including, but being not limited to, electromagnetic signals, optical signals, or any suitable combination thereof. The readable signal media may also be any readable media other than the readable storage media, and the readable media may send, propagate, or transmit programs used by or in combination with the instruction execution system, apparatus, or device. The program codes contained on the readable media may be transmitted by any suitable media, including, but being not limited to, wireless, wired, optical cable, RF (radio frequency), etc., or any suitable combination thereof.

The program codes for performing operations of the disclosure may be written in any combination of one or more programming languages. The programming languages include object-oriented programming languages such as Java, C++, as well as conventional procedural programming language such as "C" language or similar programming language. The program codes may be executed entirely on the user electronic device, executed partly on the user electronic device, executed as an independent software package, executed partly on the user electronic device and partly on the remote electronic device, or executed entirely on the remote electronic device or service. In the case of the remote electronic device, the remote electronic device may be connected to the user electronic device through any kind of networks including a local area network (LAN) or a wide area network (WAN), or connected to an external electronic device (for example, connected through Internet of the connected service provider).

It should be noted that although several units or subunits of the apparatus are mentioned in the above detailed description, this division is only exemplary and not mandatory. In fact, according to the embodiments of the disclosure, features and functions of two or more units described above may be embodied in one unit. Conversely, features and functions of one unit described above may be further divided into multiple units.

In addition, although the operations of the method of the disclosure are described in a specific order in the drawings, this does not require or imply that these operations must be performed in the specific order, or that all the operations shown must be performed to achieve the desired result. Additionally, or alternatively, some actions may be omitted, multiple actions may be combined into one action for execution, and/or one action be decomposed into multiple actions for execution.

Those skilled in the art should understand that the embodiments of the disclosure may be provided as methods, systems, or computer program products. Therefore, the disclosure may adopt the form of complete hardware embodiment, complete software embodiment, or embodiment combining software and hardware. Moreover, the disclosure may also adopt the form of computer program product implemented on one or more computer-usable storage media (such as disk storage, CD-ROM, optical storage, etc.) containing computer-usable program codes.

The disclosure is described with reference to flowcharts and/or block diagrams of methods, apparatus (systems), and computer program products according to embodiments of the disclosure. It should be understood that each process and/or block in the flowcharts and/or block diagrams, and the combination of processes and/or blocks in the flowcharts and/or block diagrams may be implemented by computer program instructions. These computer program instructions may be provided to a general-purpose computer, a special-purpose computer, an embedded processor, or a processor of other programmable image zooming equipment to generate a machine, so that the instructions executed by the computer or the processor of other programmable image zooming equipment may generate a device that implements functions specified in one process or multiple processes in the flowcharts and/or one block or multiple blocks in the block diagrams.

These computer program instructions may also be stored in a computer-readable memory that may guide a computer or other programmable image zooming equipment to work in a specific manner, so that the instructions stored in the computer-readable memory produce an article of manufacture including the instruction device. The instruction device implements functions specified in one process or multiple processes in the flowcharts and/or one block or multiple blocks in the block diagram.

These computer program instructions may also be loaded on a computer or other programmable image zooming equipment, so that a series of operations are executed on the computer or other programmable equipment to produce computer-implemented processing. Therefore, the instructions executed on the computer or other programmable equipment may provide actions for implementing functions specified in one process or multiple processes in the flowcharts and/or one block or multiple blocks in the block diagram.

Although the embodiments of the disclosure have been described, those skilled in the art may make additional changes and modifications to these embodiments once they learn the basic creative concepts. Therefore, the appended claims are intended to be interpreted as including the embodiments and all changes and modifications falling within the scope of the disclosure.

Obviously, those skilled in the art may make various changes and modifications to the disclosure without departing from the spirit and scope of the disclosure. In this way, if these modifications and changes of the disclosure fall within the scope of the claims of the disclosure and their equivalent technologies, the disclosure is also intended to include these modifications and changes.

What is claimed is:

1. A method for displaying a video, comprising:
   obtaining key content information of a first video, the key content information for indicating a key element region included in the first video;
   obtaining a second video by processing the first video based on the key content information and a size of a display region, the second video being suitable to the size of the display region, and the second video comprising the key element region; and
   displaying the second video in the display region,
   wherein obtaining the second video by processing the first video based on the key content information and the size of the display region comprises: determining a zoom ratio of the first video based on the key content information and the size of the display region; and obtaining the second video by zooming out the first video based on the zoom ratio.

2. The method as claimed in claim 1, wherein obtaining the key content information of the first video comprises:
   obtaining a location region of each of key elements in the first video;
   determining a total region range of the key elements in the first video based on the location region of each of key elements in the first video as the key element region; and
   determining the key content information based on the key element region.

3. The method as claimed in claim 2, wherein the key elements are subtitles, obtaining the location region of each of the key elements in the first video comprises:
   obtaining a location region of each subtitle in the first video by character recognition on each frame of the first video.

4. The method as claimed in claim 2, wherein determining the total region range of the key elements in the first video based on the location region of each of the key elements in the first video comprises:
   determining a smallest bounding box capable of enclosing the location region of each of the key elements in the first video as the key element region.

5. The method as claimed in claim 1, further comprising:
   determining a first zoom ratio based on a size of the first video and the size of the display region, so that a size of a target direction of the first video after zooming out is equal to a size of the target direction of the display region, the target direction being any one of length and width directions;
   determining a second zoom ratio based on the key content information so that a shortest distance from at least one boundary of the key element region after zooming out the first video to a boundary of the display region is smaller than a designated distance; and
   selecting a minimum of the first zoom ratio and the second zoom ratio as the zoom ratio of the first video.

6. The method as claimed in claim 5, wherein the key content information comprises one or more of:
   a first ratio between a left boundary distance and a width of the display region; the left boundary distance is a distance between a left boundary of the key element region and a left boundary of the first video;
   a second ratio between a top distance and a height of the display region; the top distance is a distance between a top of the key element region and a top of the first video;
   a third ratio between a width of the key element region and the width of the display region;
   a fourth ratio between a height of the key element region and the height of the display region; wherein,
   determining the second zoom ratio based on the key content information comprises:
   determining a left zooming-out factor based on the first ratio, wherein, a left boundary of the key element region is zoomed out based on the left zooming-out factor to has a distance with a left boundary of the display region and less than the designated distance;
   determining a right zooming-out factor based on the first ratio and the third ratio, wherein, a right boundary of the key element region is zoomed out based on the right zooming-out factor to has a distance with a right boundary of the display region and less than the designated distance;
   determining a top zooming-out factor based on the second ratio, wherein a top of the key element region is zoomed out based on the top zooming-out factor to has a distance with a top of the display region and less than the designated distance;
   determining a bottom zooming-out factor based on the second ratio and the fourth ration, wherein a lower boundary of the key element region is zoomed out based on the bottom zooming-out factor to has a distance with a lower boundary of the display region and less than the designated distance; and
   selecting a minimum of the left zooming-out factor, the right zooming-out factor, the top zooming-out factor, and the bottom zooming-out factor as the second zoom ratio.

7. The method as claimed in claim 6, further comprising:
   determining that the left zooming-out factor is a zooming-out upper limit in response to the first ratio being greater than or equal to a reference ratio; and
   determining the left zooming-out factor based on the reference ratio and the first ratio in response to the first ratio being less than the reference ratio.

8. The method as claimed in claim 6, further comprising:
   determining that the right zooming-out factor is a zooming-out upper limit in response to a sum of the first ratio and the third ratio being greater than or equal to a reference ratio; and
   determining the right zooming-out factor based on the reference ratio, the first ratio, and the third ratio in response to the sum of the first ratio and the third ratio being less than the reference ratio.

9. The method as claimed in claim 6, further comprising:
   determining that the top zooming-out factor is a zooming-out upper limit in response to the second ratio being greater than or equal to a reference ratio; and
   determining the top zooming-out factor based on the reference ratio and the second ratio in response to the second ratio being less than the reference ratio.

10. The method as claimed in claim 6, further comprising:
    determining that the bottom zooming-out factor is a zooming-out upper limit in response to a sum of the second ratio and the fourth ratio being greater than or equal to a reference ratio; and
    determining the bottom zooming-out factor based on the reference ratio, the second ratio, and the fourth ratio in response to the sum of the second ratio and the fourth ratio being less than the reference ratio.

11. An electronic device, comprising:
    at least one processor; and a memory communicatively coupled to the at least one processor;
wherein the memory is configured to store instructions executable by the at least one processor, and the processor is configured to execute instructions to:
obtain key content information of a first video, the key content information for indicating a key element region included in the first video;
obtain a second video by processing the first video based on the key content information and a size of a display region, the second video being suitable to the size of the display region, and the second video comprising the key element region; and
display the second video in the display region,
wherein the processor is further configured to execute instructions to:
determine a zoom ratio of the first video based on the key content information and the size of the display region; and
obtain the second video by zooming out the first video based on the zoom ratio.

12. The device as claimed in claim 11, wherein the processor is further configured to execute instructions to:
obtain a location region of each of key elements in the first video;
determine a total region range of the key elements in the first video based on the location region of each of key elements in the first video as the key element region; and
determine the key content information based on the key element region.

13. The device as claimed in claim 12, wherein under a case that the key elements are subtitles, wherein the processor is further configured to execute instructions to:
obtain a location region of each subtitle in the first video by character recognition on each frame of the first video.

14. The device as claimed in claim 12, wherein the processor is further configured to execute instructions to:
determine a smallest bounding box capable of enclosing the location region of each of the key elements in the first video as the key element region.

15. The device as claimed in claim 11, wherein the processor is further configured to execute instructions to:
determine a first zoom ratio based on a size of the first video and the size of the display region so that a size of a target direction of the first video after zooming out is equal to a size of the target direction of the display region, the target direction being any one of length and width directions;
determine a second zoom ratio based on the key content information so that a shortest distance from at least one boundary of the key element region after zooming out the first video to a boundary of the display region is smaller than a designated distance; and
select a minimum of the first zoom ratio and the second zoom ratio as the zoom ratio of the first video.

16. The device as claimed in claim 15, wherein the key content information comprises one or more of:
a first ratio between a left boundary distance and a width of the display region; the left boundary distance is a distance between a left boundary of the key element region and a left boundary of the first video;
a second ratio between a top distance and a height of the display region; the top distance is a distance between a top of the key element region and a top of the first video;
a third ratio between a width of the key element region and the width of the display region;
a fourth ratio between a height of the key element region and the height of the display region;
wherein the processor is further configured to execute instructions to:
determine a left zooming-out factor based on the first ratio, wherein, a left boundary of the key element region is zoomed out based on the left zooming-out factor to has a distance with a left boundary of the display region and less than the designated distance;
determine a right zooming-out factor based on the first ratio and the third ratio, wherein, a right boundary of the key element region is zoomed out based on the right zooming-out factor to has a distance with a right boundary of the display region and less than the designated distance;
determine a top zooming-out factor based on the second ratio, wherein a top of the key element region is zoomed out based on the top zooming-out factor to has a distance with a top of the display region and less than the designated distance;
determine a bottom zooming-out factor based on the second ratio and the fourth ration, wherein a lower boundary of the key element region is zoomed out based on the bottom zooming-out factor to has a distance with a lower boundary of the display region and less than the designated distance; and
select a minimum of the left zooming-out factor, the right zooming-out factor, the top zooming-out factor, and the bottom zooming-out factor as the second zoom ratio.

17. The device as claimed in claim 16, wherein the processor is further configured to execute instructions to:
determine that the left zooming-out factor is a zooming-out upper limit in response to the first ratio being greater than or equal to a reference ratio, and determine the left zooming-out factor based on the reference ratio and the first ratio in response to the first ratio being less than the reference ratio;
determine that the right zooming-out factor is a zooming-out upper limit in response to a sum of the first ratio and the third ratio being greater than or equal to a reference ratio, and determine the right zooming-out factor based on the reference ratio, the first ratio, and the third ratio in response to the sum of the first ratio and the third ratio being less than the reference ratio;
determine that the top zooming-out factor is a zooming-out upper limit in response to the second ratio being greater than or equal to a reference ratio, and determine the top zooming-out factor based on the reference ratio and the second ratio in response to the second ratio being less than the reference ratio; and
determine that the bottom zooming-out factor is a zooming-out upper limit in response to a sum of the second ratio and the fourth ratio being greater than or equal to a reference ratio, and determine the bottom zooming-out factor based on the reference ratio, the second ratio, and the fourth ratio in response to the sum of the second ratio and the fourth ratio being less than the reference ratio.

18. A non-transitory computer-readable storage medium having a computer program stored thereon, wherein the computer program is configured to cause a computer to perform:
obtaining key content information of a first video, the key content information for indicating a key element region included in the first video;

obtaining a second video by processing the first video based on the key content information and a size of a display region, being suitable to the size of the display region, and the second video comprising the key element region; and displaying the second video in the display region, wherein obtaining the second video by processing the first video based on the key content information and the size of the display region comprises: determining a zoom ratio of the first video based on the key content information and the size of the display region; and obtaining the second video by zooming out the first video based on the zoom ratio.

* * * * *